May 3, 1927.
P. MUELLER ET AL
SLIP JOINT COUPLING
Filed July 21, 1920
1,626,952
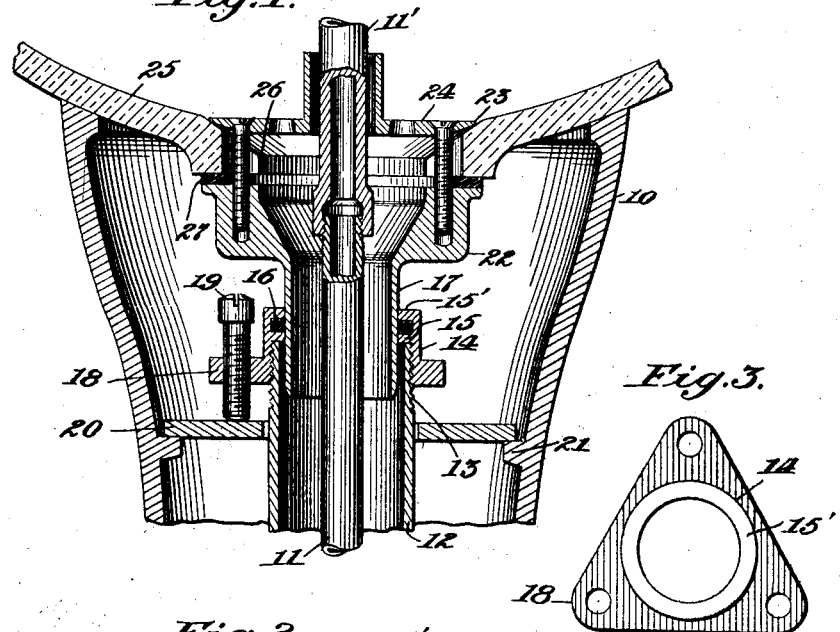
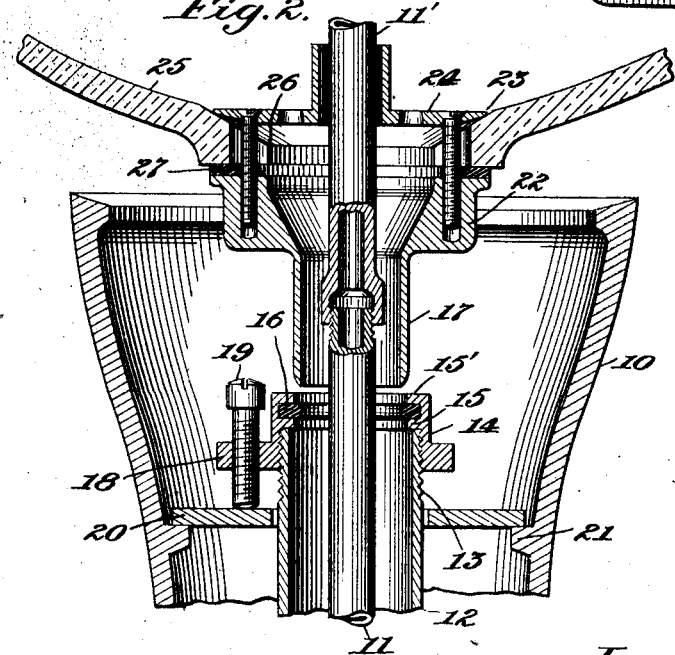
Inventors:
Philip Mueller
Anton C. Schuermann
By Cushman, Byrnes & Darby
Att'ys.

Patented May 3, 1927.

1,626,952

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

SLIP-JOINT COUPLING.

Application filed July 21, 1920. Serial No. 397,824.

This invention relates to pipe couplings, more particularly to pipe couplings of the slip joint type, and has as its object a new and improved form of slip joint coupling of general application.

Although the coupling is of a character which may be applied at any point where it is desired to connect together two pipes by a slip joint, in the accompanying drawings the same is illustrated as applied to a drinking fountain and as connecting together the waste pipe sections.

In these drawings,

Fig. 1 is a fragmentary vertical sectional view of a drinking fountain,

Fig. 2 is a view similar to Figure 1, showing the sections of the waste pipe disconnected, and Fig. 3 is a top plan view of the coupling member.

In these drawings, wherein similar numerals represent corresponding parts throughout, 10 indicates a hollow pedestal adapted to be supported upon a floor or other foundation and having extending therethrough a supply pipe 11 surrounded by a waste pipe 12. The waste pipe is exteriorly screw threaded at its upper end, as at 13, and has secured thereto a cap nut 14 extending beyond the end of the waste pipe and provided with an interiorly disposed recess formed by two spaced interiorly extending ribs 15, 15'. In the recess between the ribs is disposed a packing element 16 normally extending into the bore of a coupling member and adapted to frictionally engage the bowl waste pipe section 17 which telescopes into the waste pipe 12 and the coupling member 14.

The coupling member 14 is formed exteriorly with a projecting flange 18 in which are formed openings through which may be passed clamping screws 19 which press upon a pedestal clamping plate 20 supported upon interiorly projecting lugs 21 formed upon the pedestal. Obviously other forms of clamping elements than the screws 19 could be employed, and moreover, it is clear that instead of forming the cap nut with the flange 18, the same could be suitably formed to receive any clamping means selected.

The bowl waste pipe section is formed at its upper end with an enlargement 22 adapted to receive the ends of screws 23 which also serve to secure the bowl strainer plate 24 to the bowl 25 above the waste opening 26 therein. A gasket 27 may be placed between the bowl 25 and the bowl waste pipe section 17 in order to form a fluid tight joint.

To the upper screw threaded end of the supply pipe 11 is secured the supply pipe section 11' extending upwardly through the strainer plate and having secured to its upper end the usual bubbler head (not shown).

In assembling the structure to which the improved coupling is shown as applied, the pedestal is first placed upon its foundation around the supply and waste pipes, and the clamping plate 20 is slipped around the waste pipe and upon its supporting lugs 21. The cap nut or coupling member 14 is then placed upon the end of the waste pipe, whereupon the clamping screws may be adjusted to press upon the clamping plate and thus fixedly secure the pedestal in position. After the supply pipe section 11' has been secured to its complemental section 11 the bowl may be placed in the position shown in Figure 2 and then lowered to its final position shown in Figure 1, wherein the bowl rests upon the upper end of the pedestal and the bowl waste section 17 telescopes the coupling member 14 and the waste pipe 12.

It should be clear that this type of slip joint coupling is particularly useful in connection with drinking fountains, to which we have shown and described it as applied, but it should, of course, be understood that the same is of general application and such modifications may be made therein as come within the scope of the following claims.

What we claim is:

1. The combination with a pipe to be coupled having an exteriorly threaded end, of a correspondingly interiorly threaded coupling connected to said pipe, a recess in said coupling, an interiorly projecting packing seated in said recess, a clamping plate encircling said pipe, a second pipe telescoping said first mentioned pipe and in frictional engagement with said packing, a flange projecting outwardly from said coupling having a plurality of openings therein, and means extending through said openings for maintaining the clamping plate in position.

2. The combination with a drinking fountain pedestal, of a pipe traversing said pedestal having an exteriorly threaded upper end, a correspondingly interiorly threaded coupling connected to said pipe, a recess in said coupling, an interiorly projecting packing seated in said recess, a second pipe telescoping said first mentioned pipe and in frictional engagement with said packing, a flange projecting outwardly from said coupling, a clamping plate, means on the inner wall of said pedestal for supporting said plate, and means adjustably secured to said flange for clamping the plate to said pedestal.

3. A pipe coupling comprising a tubular body having an interiorly threaded section, an interior annular recess beyond one end of said threaded section, and an exterior radially extending projection, a flexible packing seated in said recess and projecting therefrom into the body, and means connected with said exterior projection and adapted to engage a relatively stationary abutment.

4. A pipe coupling comprising a tubular body having an interiorly threaded section, an interior annular recess beyond one end of said threaded section, and an exterior radially extending projection, a flexible packing seated in said recess and projecting therefrom into the body, and a plurality of screws extending through and having threaded engagement with said exterior projection.

5. A pipe coupling comprising a sleevelike member adapted to be engaged with a pipe and having an outwardly projecting flange of substantially triangular form in a plane transverse to the pipe axis, the inner periphery of said coupling member having an annular recess formed therein, a flexible packing in said recess, and means supported by said flange for clamping the coupling to a relatively stationary member.

In testimony whereof we have hereunto set our hands.

PHILIP MUELLER.
ANTON C. SCHUERMANN.